(12) United States Patent
Takori et al.

(10) Patent No.: US 12,139,069 B2
(45) Date of Patent: Nov. 12, 2024

(54) LIGHTING DISPLAY DEVICE FOR VEHICLE

(71) Applicant: HONDA MOTOR CO., LTD., Tokyo (JP)

(72) Inventors: Masayoshi Takori, Wako (JP); Yuji Tsuchiya, Wako (JP); Kei Oshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/582,713

(22) Filed: Feb. 21, 2024

(65) Prior Publication Data

US 2024/0308423 A1    Sep. 19, 2024

(30) Foreign Application Priority Data

Mar. 17, 2023    (JP) .................. 2023-043184

(51) Int. Cl.
| | |
|---|---|
| *B60Q 1/50* | (2006.01) |
| *F21S 41/43* | (2018.01) |
| *F21S 43/20* | (2018.01) |
| *F21W 103/60* | (2018.01) |
| *F21Y 115/10* | (2016.01) |

(52) U.S. Cl.
CPC .............. *B60Q 1/503* (2013.01); *F21S 41/43* (2018.01); *F21S 43/26* (2018.01); *F21W 2103/60* (2018.01); *F21Y 2115/10* (2016.08)

(58) Field of Classification Search
CPC ................................. B60Q 1/503; F21S 41/43
See application file for complete search history.

(56) References Cited

U.S. PATENT DOCUMENTS

2018/0010754 A1*    1/2018   Albou ..................... H01L 33/06

FOREIGN PATENT DOCUMENTS

JP                03-091834           9/1991

* cited by examiner

*Primary Examiner* — Sean P Gramling
(74) *Attorney, Agent, or Firm* — Amin, Turocy & Watson, LLP

(57) ABSTRACT

A lighting display device for a vehicle includes a tube assembly wall, a plurality of light sources, and a lighting controller. In the tube assembly wall, a plurality of tubes directed in a lighting display direction at the front or rear of a vehicle are arrayed in a vertical direction and a vehicle width direction. The light sources are disposed facing the inside of at least some tubes in the tube assembly wall. The lighting controller controls lighting of the light sources such that information such as figures and characters is displayed.

6 Claims, 7 Drawing Sheets

LIGHTING DISPLAY DEVICE FOR VEHICLE

CROSS-REFERENCE TO RELATED APPLICATION

Priority is claimed on Japanese Patent Application No. 2023-43184, filed Mar. 17, 2023, the content of which is incorporated herein by reference.

BACKGROUND OF THE INVENTION

Field of the Invention

The present invention relates to a lighting display device for a vehicle performing lighting display of characters, figures, and the like at the front or rear of a vehicle.

Description of Related Art

A device in which an opening is provided in a rear panel in a rear part of a vehicle and a lighting display device using LED light sources is disposed inside the opening has been devised (for example, refer to Japanese Unexamined Utility Model Application, First Publication No. H3-91834).

The lighting display device for a vehicle disclosed in Japanese Unexamined Utility Model Application, First Publication No. H3-91834 includes a printed board on which a plurality of LED light emitting elements are disposed in a matrix. The printed board is installed inside an opening formed in a rear panel in a rear part of a vehicle. The opening is blocked by a lens having a transparent light transmission part. The plurality of LED light emitting elements are lit such that predetermined characters and figures are displayed by means of a drive circuit. Lighting of the plurality of LED light emitting elements can be visually recognized from the side behind the vehicle through the lens. Accordingly, the lighting display device can provide various information to a following vehicle and the like.

SUMMARY OF THE INVENTION

The lighting display device for a vehicle disclosed in Japanese Unexamined Utility Model Application, First Publication No. H3-91834 can perform lighting display of characters, figures, and the like at the rear of a vehicle by lighting a plurality of LED light emitting elements. However, when the LED light emitting elements are not lit, the plurality of LED light emitting elements and a printed board for mounting the elements can be seen from the outside of the vehicle through a light transmission part of a lens, and there is concern that the design of the exterior appearance may deteriorate.

Hence, the present invention provides a lighting display device for a vehicle capable of performing lighting display of information such as figures and characters without deteriorating the design of the exterior appearance, and contributing to development of sustainable transportation systems as well.

The lighting display device for a vehicle according to the present invention employs the following constitutions.

That is, the lighting display device for a vehicle according to the present invention includes a tube assembly wall (for example, a tube assembly wall 21 of an embodiment) in which a plurality of tubes (for example, tubes 22 of the embodiment) directed in a lighting display direction at the front or rear of a vehicle are arrayed in a vertical direction and a vehicle width direction, a plurality of light sources (for example, light sources 26 of the embodiment) which are disposed facing the inside of at least some tubes in the tube assembly wall, and a lighting controller (for example, a lighting controller 28 of the embodiment) which controls lighting of the light sources such that information such as figures and characters is displayed.

According to the foregoing constitution, when information such as figures and characters is displayed to the outside of the vehicle, the light sources are lit by control of the lighting controller. Light of the lit light sources is emitted to the outside of the vehicle through the tubes in the tube assembly wall. A viewer outside the vehicle can recognize characters, figures, and the like displayed by light of the light sources lit inside the tubes.

In addition, when the light sources are not lit, the light sources are hidden by surrounding walls of the tubes and are unlikely to be seen from the outside. Therefore, when this constitution is employed, the tube assembly wall seems to be a mesh-like design wall from the outside of the vehicle so that the design of the exterior appearance can be favorably maintained. Particularly, when the tube assembly wall is provided between left and right headlights in a front part of the vehicle or between left and right brake lamps in a rear part of the vehicle, the tube assembly wall seems to be a grille-like design wall so that the design of the exterior appearance is further enhanced.

Each of the tubes may be formed to have a hexagonal surrounding wall (for example, a surrounding wall 22a of the embodiment). The plurality of tubes may be disposed in a zigzag shape in the vertical direction and the vehicle width direction.

In this case, the surrounding walls of the tubes constituting the tube assembly wall form a continuous honeycomb shape. For this reason, the strength of the tube assembly wall is enhanced, and the appearance has a more grille-like shape so that the design of the exterior appearance is further enhanced.

A Y-shaped connection wall (for example, a connection wall 23 of the embodiment) connecting three top parts (for example, top parts 22t of the embodiment) at intervals of every other hexagonal surrounding wall may be provided on a front part side of each of the tubes in the lighting display direction.

In this case, since the Y-shaped connection walls are provided on a front surface side of the hexagonal surrounding walls of the tubes, the strength of the tubes is efficiently enhanced, and the surrounding walls of the tubes and the connection walls seem to have a rectangular parallelepiped three-dimensional shape. Therefore, when this constitution is employed, the strength of the tube assembly wall can be enhanced, and the design can also be further enhanced.

The Y-shaped connection wall may be formed to have a narrower width than the surrounding wall in a front view.

In this case, while the appearance is maintained to have a grille-like shape by the surrounding walls of the tubes having a relatively wide width in a front view, the Y-shaped connection walls are caused to have a relatively narrow width in a front view. Therefore, the surrounding walls and the connection walls are more likely to be seen in a three-dimensional rectangular parallelepiped shape.

The tubes each may include a contour wall (for example, a contour wall 24 of the embodiment) disposed toward the lighting display direction, and an inner wall (for example, an inner wall 25 of the embodiment) extending from the contour wall to a side opposite in the lighting display direction. The light sources may be each disposed at a position overlapping the inner wall in a forward-rearward direction on an inward side of the inner wall.

In this case, while the design of the exterior appearance of the tubes is enhanced by the contour wall, the light sources can be surrounded by the inner walls, and light of the light sources can be made unlikely to leak to sides of other adjacent tubes. As a result, edges of regions lit by the light sources become distinct so that characters and figures for lighting display can be shown sharply.

In addition, when the light sources are not lit, the light sources are hidden by the inner walls and are less likely to be seen from the outside.

A light blocking wall (for example, a light blocking wall 30 of the embodiment) extending to a front side in the lighting display direction may be provided in an upper region of at least a part of the contour wall.

In this case, outdoor light can be blocked from reaching the light sources inside the tubes by the light blocking walls. For this reason, even when lighting display of characters and figures is performed by lighting the light sources during the daytime, lighting display thereof can be prevented from being unlikely to be seen due to outside light.

In the lighting display device for a vehicle according to the present invention, a plurality of light sources are disposed facing the inside of at least some tubes in the tube assembly wall, and lighting of the light sources toward the insides of the tubes is controlled by the lighting controller. For this reason, when the light sources are not lit, the light sources are hidden by the surrounding walls of the tubes and are unlikely to be seen from the outside.

Therefore, when the lighting display device for a vehicle according to the present invention is employed, it is possible to perform lighting display of information such as figures and characters without deteriorating the design of the exterior appearance.

DETAILED DESCRIPTION OF THE INVENTION

Figure 1:
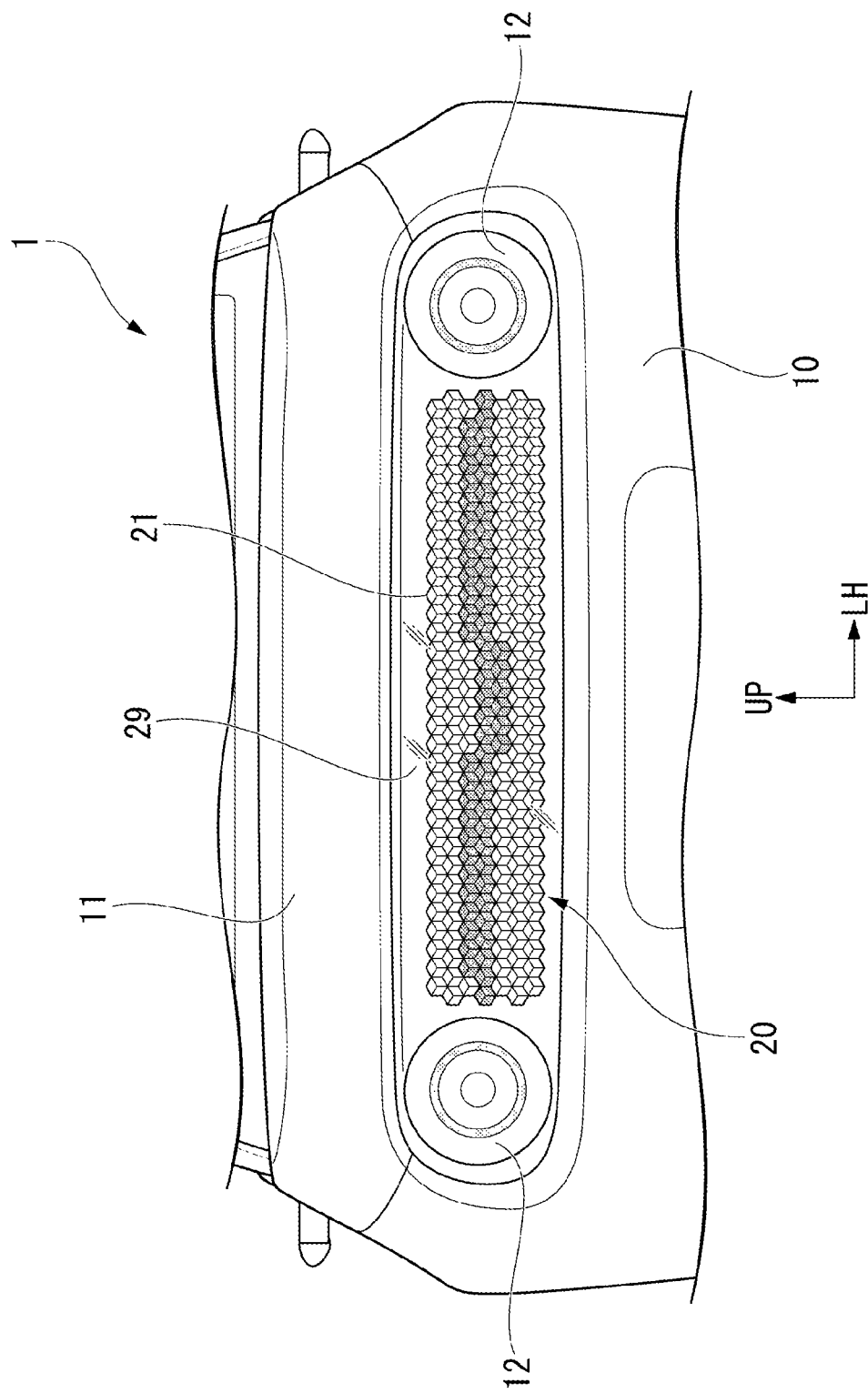
FIG. 1 is a front view of a vehicle of a first embodiment.

Hereinafter, embodiments of the present invention will be described based on the drawings.

In each of the embodiments which will be described below, the same reference signs are applied to common parts, and some of duplicate description will be omitted. In addition, an arrow UP indicating a side above a vehicle, an arrow FR indicating a side in front of the vehicle, and an arrow LH indicating the left side of the vehicle are marked at suitable locations in the drawings.

First Embodiment

FIG. 1 is a front view of a vehicle 1 of the present embodiment.

In FIG. 1, the reference sign 10 indicates a front bumper in a front part of the vehicle 1, and the reference sign 11 indicates a front hood covering a side above a motor compartment (not shown). Left and right headlights 12 are disposed spaced apart in a vehicle width direction above the front bumper 10 in the front part of the vehicle 1. A grille-like tube assembly wall 21 constituting a part of a lighting display device 20 of the present embodiment is disposed between the left and right headlights 12 in the front part of the vehicle 1.

The vehicle 1 of the present embodiment is an electric vehicle having an electric motor as a drive source, and an electric motor for vehicle driving is accommodated in the motor compartment below the front hood 11. However, the drive source of the vehicle 1 is not limited to an electric motor. The drive source of the vehicle 1 may be an internal-combustion engine or may be a hybrid drive source using both an internal-combustion engine and an electric motor.

Figure 2:
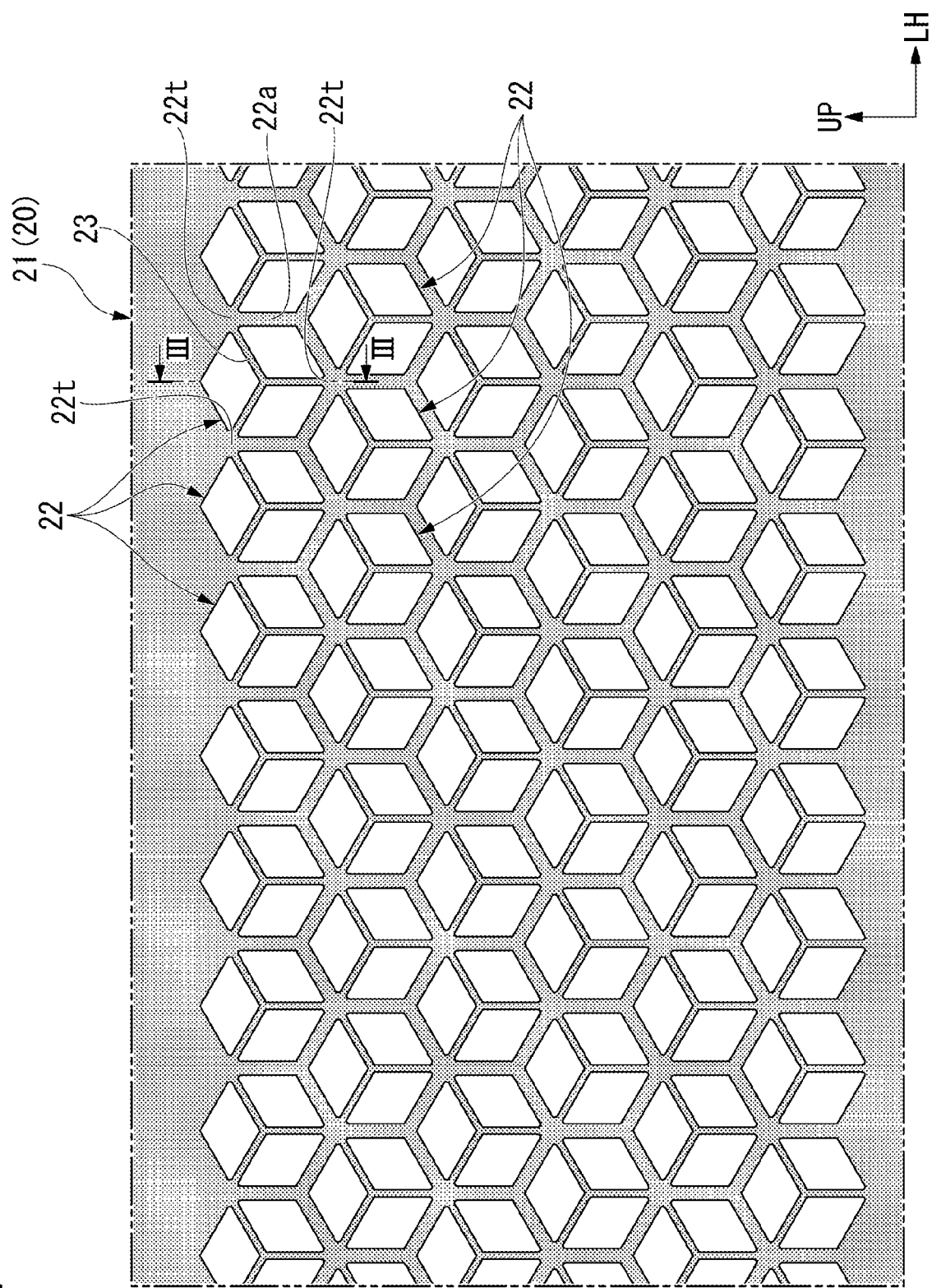
FIG. 2 is a front view of a lighting display device of the first embodiment.
Figure 3:
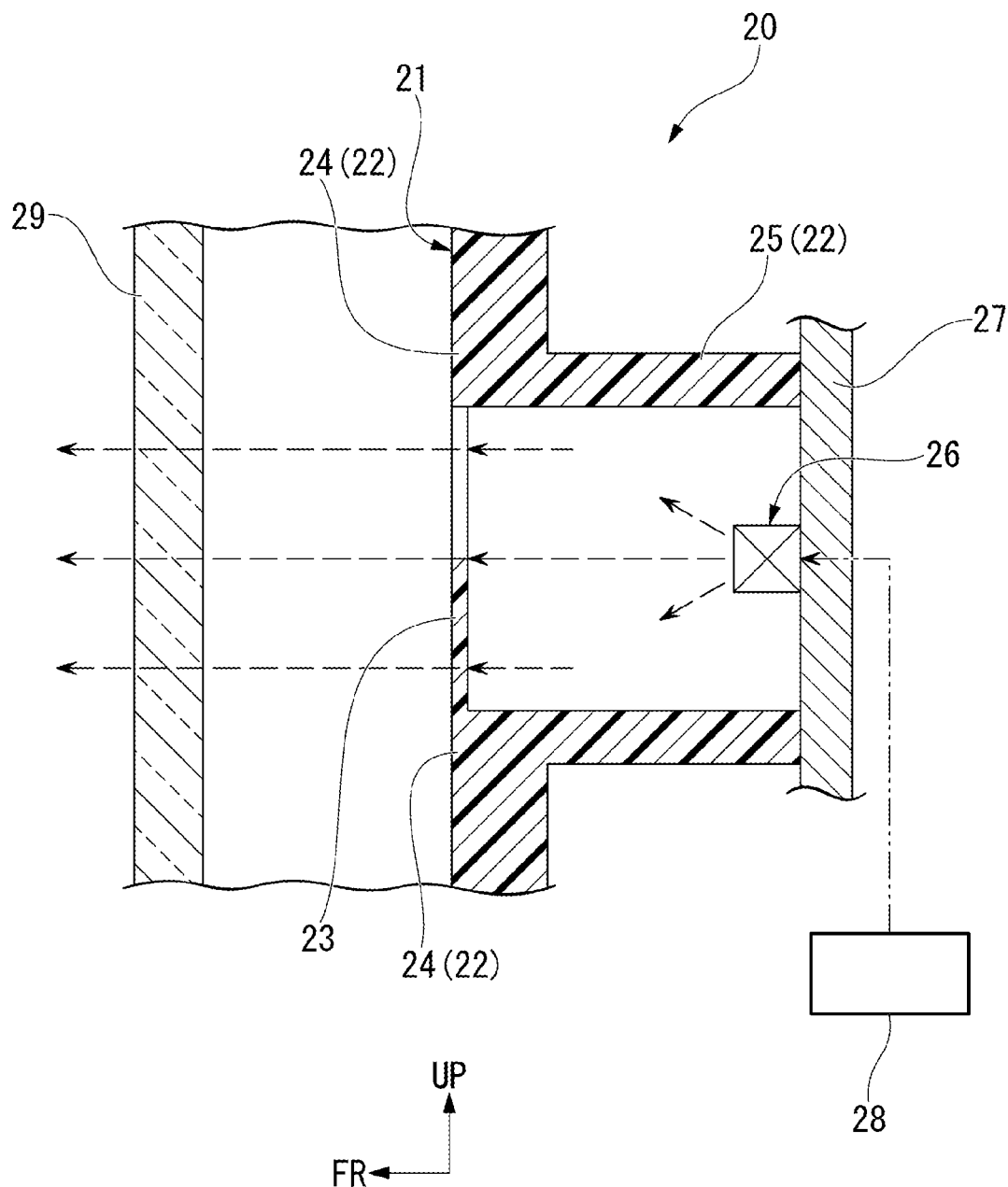
FIG. 3 is a cross-sectional view of the lighting display device of the first embodiment along line III-III in FIG. 2.
Figure 4:
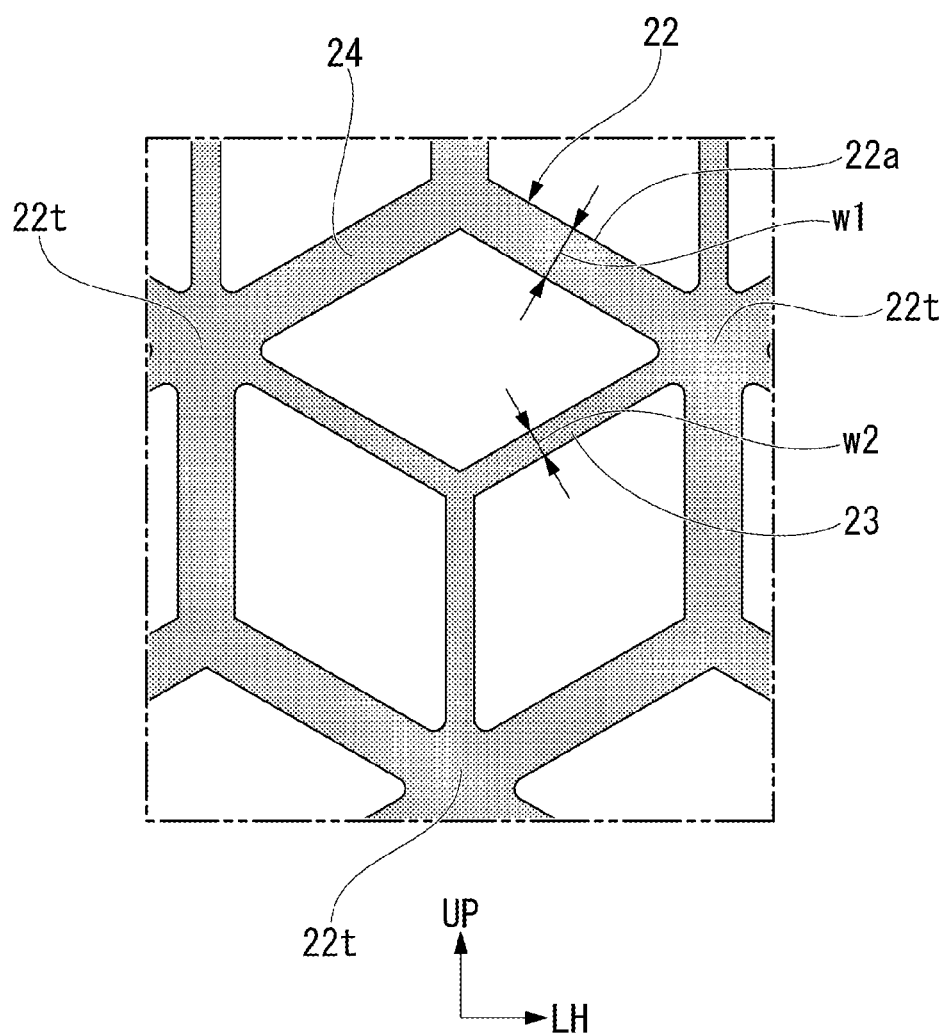
FIG. 4 is a partially enlarged view of a tube assembly wall of the first embodiment.

FIG. 2 is a front view of the tube assembly wall 21 (lighting display device 20), and FIG. 3 is a cross-sectional view of the lighting display device 20 along line III-III in FIG. 2. In addition, FIG. 4 is an enlarged view of a part of the tube assembly wall 21.

In the tube assembly wall 21, a plurality of tubes 22 directed to a side in front of the vehicle (in a lighting display direction) are disposed in a vertical direction and the vehicle width direction. For example, the tube assembly wall 21 is integrally formed using a hard resin. Each of the tubes 22 is formed to have a hexagonal surrounding wall 22a. The plurality of tubes 22 are disposed in a zigzag shape in the vertical direction and the vehicle width direction. A Y-shaped connection wall 23 connecting top parts 22t at intervals of every other the hexagonal surrounding wall 22a is provided on the front part side (side in the lighting display direction) of each of the tubes 22. As shown in FIG. 4, a width w2 of the Y-shaped connection wall 23 in a front view is set to be narrower than a width w1 of the surrounding wall 22a in a front view.

In addition, as shown in FIG. 3, each of the tubes 22 includes a contour wall 24 disposed on the front side (disposed toward the lighting display direction), and an inner wall 25 extending from the contour wall 24 to the rear side (a side opposite in the lighting display direction) and having a smaller outer contour than the contour wall 24. In the present embodiment, the thickness of the inner wall 25 is smaller than the thickness of the contour wall 24. The Y-shaped connection wall 23 is connected in a manner of being flush with a front part region of the contour wall 24.

In addition, as shown in FIG. 3, a substrate 27 for mounting a plurality of light sources 26 such as LED light emitting elements is installed in a rear part of the tube assembly wall 21. Each of the light sources 26 mounted on the substrate 27 is disposed on the inward side of each of the plurality of tubes 22 (disposed facing the inside of each of the tubes 22) in the tube assembly wall 21. Each of the light sources 26 is disposed at a position overlapping the inner wall 25 in a forward-rearward direction on the inward side of the inner wall 25 in each of the tubes 22. Each of the light sources 26 is disposed such that it vertically overlaps upper and lower walls of the inner wall 25 when the inner wall 25 is viewed in the vertical direction. The rear part side of each of the tubes 22 is blocked by the substrate 27.

The light sources 26 does not necessarily have to be disposed inside the tubes 22. Namely, some of the plurality of tubes 22 may have no light source 26 disposed therein. In this case, the rear side of the tube 22 having no light source 26 disposed therein may not be blocked by the substrate 27.

Lighting of each of the light sources 26 disposed inside the tubes 22 is controlled by a lighting controller 28. The lighting controller 28 controls lighting of the light sources 26 such that figures and characters (various kinds of information) which have been stored in a storage unit in advance are displayed in response to an instruction operation of a driver or an action of the vehicle.

In addition, as shown in FIGS. 1 and 3, an outer lens 29 made of a light-transmitting resin material or the like is installed on the front side of the tube assembly wall 21. The outer lens 29 restricts entry of dust and water droplets to the inside of the tubes 22 in the tube assembly wall 21 and transmits light of the light sources 26 inside the tubes 22 to the front.

In FIGS. 2 and 4, illustration of the outer lens 29 is omitted.

The lighting display device 20 having the foregoing constitution causes the light sources 26 to perform lighting through control by the lighting controller 28 when information such as figures and characters is displayed in the front of the vehicle. Light of the light sources 26 lit in this manner is emitted to the front side of the vehicle through the tubes 22 in the tube assembly wall 21. A viewer outside the vehicle can recognize characters, figures, and the like displayed by light of the light sources lit inside the tubes.

In the lighting display device 20 of the present embodiment, the plurality of light sources 26 are disposed facing the inside of at least some tubes 22 in the tube assembly wall 21, and lighting of the light sources 26 toward the insides of the tubes 22 is controlled by the lighting controller 28. Further, when the light sources 26 are not lit, the light sources 26 are hidden by the surrounding walls 22a of the tubes 22 and are unlikely to be seen from the outside. For this reason, the tube assembly wall 21 seems to be a mesh-like design wall from the outside of the vehicle so that the design of the exterior appearance can be favorably maintained. Particularly, when the tube assembly wall 21 is provided between the left and right headlights 12 in the front part of the vehicle or between left and right brake lamps in the rear part of the vehicle, the tube assembly wall 21 seems to be a grille-like design wall so that the design of the exterior appearance is further enhanced.

Therefore, when the lighting display device 20 of the present embodiment is employed, lighting display of information such as figures and characters can be performed without deteriorating the design of the exterior appearance, and this can contribute to development of sustainable transportation systems.

In addition, in the lighting display device 20 of the present embodiment, the surrounding wall 22a of each of the tubes 22 in the tube assembly wall 21 is formed to have a hexagonal shape. Further, in the tube assembly wall 21, the plurality of tubes 22 are constituted to be disposed in a zigzag shape in the vertical direction and the vehicle width direction. For this reason, the surrounding walls 22a of the tubes 22 in the tube assembly wall 21 form a continuous honeycomb shape.

Therefore, when the lighting display device 20 of the present embodiment is employed, the strength of the tube assembly wall 21 can be further enhanced, and the appearance has a more grille-like shape so that the design of the exterior appearance is further enhanced.

In addition, in the lighting display device 20 of the present embodiment, the Y-shaped connection wall 23 connecting three top parts 22t at intervals of every other the hexagonal surrounding wall 22a is provided on the front part side of each of the tubes 22. For this reason, the strength of the tubes 22 can be efficiently enhanced by the Y-shaped connection wall 23, and the Y-shaped connection wall 23 together with the surrounding walls 22a of the tubes 22 seem to have a rectangular parallelepiped three-dimensional shape.

Figure 5:
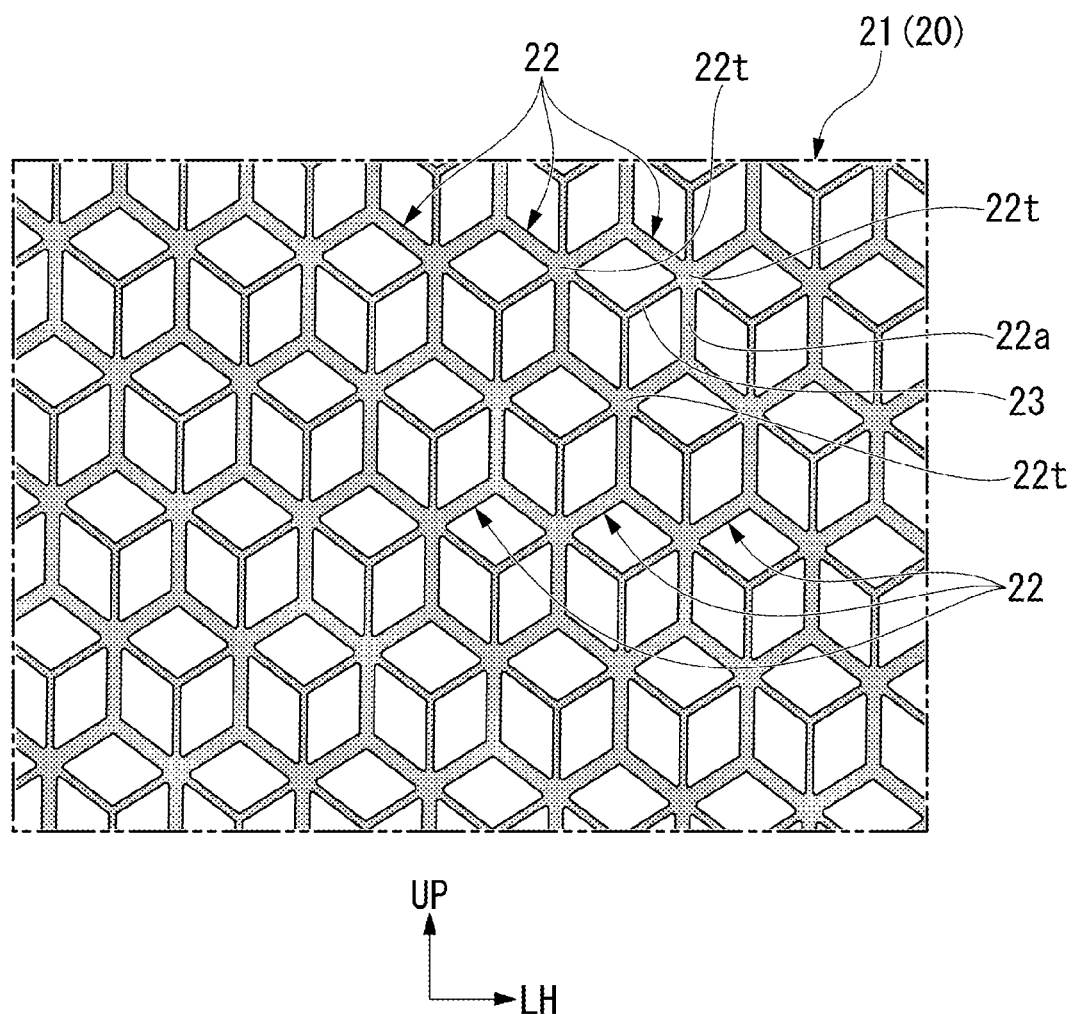
FIG. 5 is a view of the lighting display device of the first embodiment viewed obliquely from the front.

FIG. 2 is a view of the tube assembly wall 21 viewed from the front, and FIG. 5 is a view of the lighting display device 20 when viewed from a position shifted obliquely to the left side from the front.

As is clear from these diagrams, by adding the Y-shaped connection wall 23 to the front part of each of the surrounding walls 22a of the tubes 22, they seem to have a rectangular parallelepiped three-dimensional shape when they are seen not only in a front view but also obliquely from the front.

Therefore, when the lighting display device 20 of the present embodiment is employed, the strength of the tube assembly wall 21 can be enhanced, and the design can also be further enhanced.

Moreover, in the lighting display device 20 of the present embodiment, the width w2 of the Y-shaped connection wall 23 in a front view is set to be narrower than the width w1 of the surrounding wall 22a in a front view. For this reason, while the appearance is maintained to have a grille-like shape by the surrounding walls 22a of the tubes 22 having a relatively wide width in a front view, the Y-shaped connection walls 23 are caused to have a relatively narrow width in a front view. Therefore, the surrounding walls 22a and the connection walls 23 are more likely to be seen in a three-dimensional rectangular parallelepiped shape.

Therefore, when the constitution of the present embodiment is employed, the design of the tube assembly wall 21 can be further enhanced.

In addition, the lighting display device 20 of the present embodiment, each of the tubes 22 in the tube assembly wall 21 includes the contour wall 24 toward the front side, and the inner wall 25 extending from the contour wall 24 to the rear side. Further, the light sources 26 are each disposed at a position overlapping the inner wall 25 in the forward-rearward direction on the inward side of the inner wall 25. For this reason, while the design of the exterior appearance of the tubes 22 is enhanced by the contour wall 24, the light sources 26 can be surrounded by the inner walls 25, and light of the light sources 26 can be made unlikely to leak to sides of other adjacent tubes 22.

Therefore, when this constitution is employed, edges of regions lit by the light sources 26 become distinct so that characters and figures for lighting display can be shown sharply.

In addition, when the light sources 26 are not lit, the light sources 26 are hidden by the inner walls 25 and are less likely to be seen from the outside. Therefore, the design of the exterior appearance is further enhanced.

Moreover, in this constitution, since the outer contour of the inner wall 25 is smaller than the outer contour of the contour wall 24, weight reduction of the tube assembly wall 21 in its entirety can be achieved.

Second Embodiment

Figure 6:
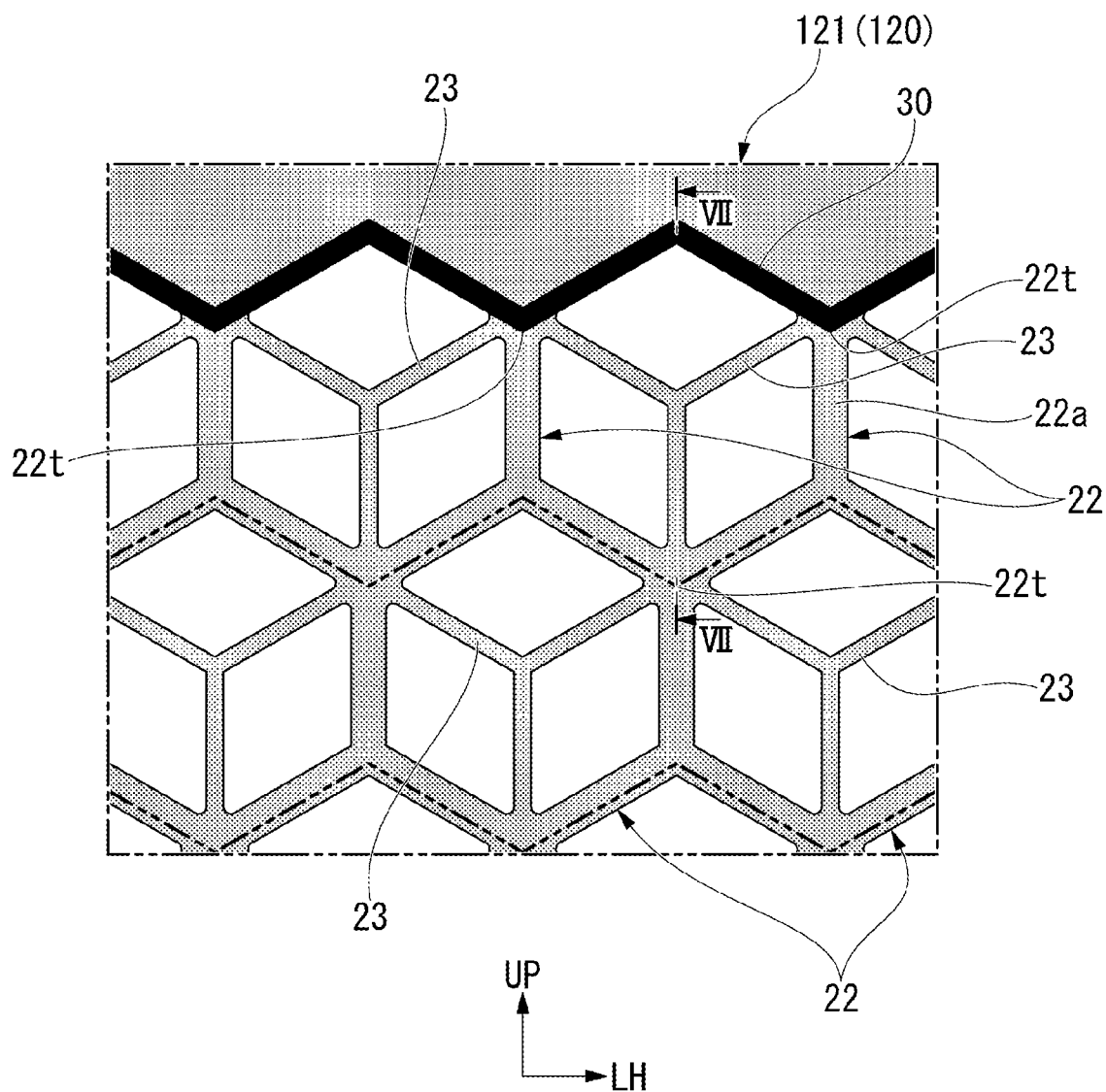
FIG. 6 is a front view of a lighting display device of a second embodiment.
Figure 7:
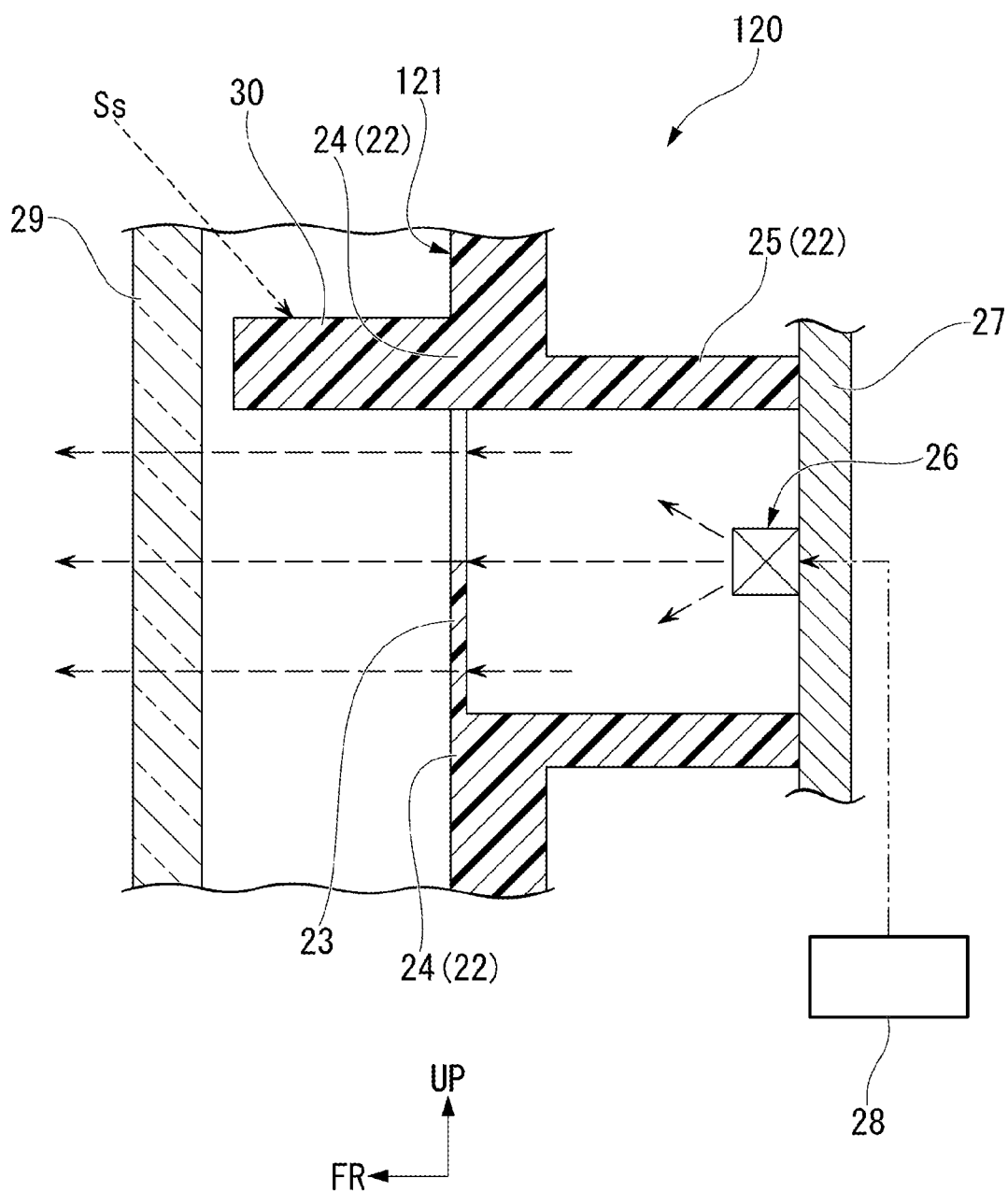
FIG. 7 is a cross-sectional view of the lighting display device of the second embodiment along line VII-VII in FIG. 6.

FIG. 6 is a front view of a lighting display device 120 of the present embodiment, and FIG. 7 is a cross-sectional view of the lighting display device 120 along line VII-VII in FIG. 6.

The basic constitution of the lighting display device 120 of the present embodiment is similar to that in the first embodiment. However, it differs in that a light blocking wall 30 extending to the front side is provided in an upper edge part of the contour wall 24 of each of the tubes 22 in the uppermost part of a tube assembly wall 121. The light blocking walls 30 are walls for blocking outside light Ss from a side above the front part of the vehicle from being incident inside the tubes 22 and continuously extend in the upper edge parts of the contour walls 24 in the uppermost part of the tube assembly wall 121.

However, as indicated by the virtual lines in FIG. 6, the light blocking wall 30 may also similarly extend in the upper edge parts of the contour walls 24 on a side below the tubes 22 in the uppermost part of the tube assembly wall 121.

Since the lighting display device 120 of the present embodiment has a basic constitution similar to that of the first embodiment, it is possible to achieve basic effects similar to those of the first embodiment described above.

In addition to this, in the lighting display device 120 of the present embodiment, since the light blocking wall 30 extending to the front side is provided in the upper edge part of the contour wall 24 of each of the tubes 22 in the tube assembly wall 121, outdoor light (outside light Ss) can be blocked from reaching the light sources 26 inside the tubes 22 by the light blocking walls 30.

Therefore, when the lighting display device 120 of the present embodiment is employed, even when lighting display of characters and figures is performed by lighting the light sources 26 during the daytime, lighting display thereof can be prevented from being unlikely to be seen due to the outside light Ss.

In addition, in the lighting display device 120 of the present embodiment, the light blocking wall 30 is provided in only the upper edge part of the contour wall 24 of each of the tubes 22 in the tube assembly wall 121, and the light blocking wall 30 is not provided in left and right side edge parts of the contour wall 24. For this reason, when this constitution is employed, visibility of light of the light sources 26 from positions shifted to the left and right from the front of the vehicle is enhanced.

In addition, as indicated by the solid line in FIG. 6, when the light blocking wall 30 is provided in only the upper edge part of each of the tubes 22 in the uppermost part of the tube assembly wall 121, visibility of light of the light sources 26 disposed inside the tubes 22 below the tubes 22 in the uppermost part is enhanced.

The present invention is not limited to the foregoing embodiments, and various design changes can be made within a range not departing from the gist thereof. For example, in the foregoing embodiments, LED light emitting elements used as light sources of a lighting display device has been described as an example, but light sources of a lighting display device are not limited to LED light emitting elements. Various types of light sources can be employed as long as they can perform lighting with light toward the lighting display direction.

In addition, in the foregoing embodiments, the lighting display device is installed in the front part of the vehicle, but the lighting display device can also be installed in the rear part of the vehicle. In this case, the lighting display direction of the lighting display device is directed to the side behind the vehicle, and each of the tubes in the tube assembly wall opens to the side behind the vehicle.

Moreover, in the foregoing embodiments, the outer lens is disposed on the front side of the tube assembly wall, and the rear side of the tube assembly wall is blocked by the substrate. However, when it is employed in a vehicle using an internal-combustion engine or a hybrid drive source, the outer lens may be eliminated and the substrate may be moved to a position where it does not block the tubes. In this case, the tube assembly wall can be caused to function as a grille through which cooling air passes.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Vehicle
20, 120 Lighting display device
21, 121 Tube assembly wall
22 Tube
22a Surrounding wall
22t Top part
23 Connection wall
24 Contour wall
25 Inner wall
26 Light source
28 Lighting controller
30 Light blocking wall

What is claimed is:

1. A lighting display device for a vehicle comprising:
a tube assembly wall in which a plurality of tubes directed in a lighting display direction at the front or rear of a vehicle are arrayed in a vertical direction and a vehicle width direction;
a plurality of light sources which are disposed facing the inside of at least some tubes in the tube assembly wall; and
a lighting controller which controls lighting of the light sources such that information such as figures and characters is displayed,
wherein each of the tubes is formed to have a hexagonal surrounding wall, and
the plurality of tubes are disposed in a zigzag shape in the vertical direction and the vehicle width direction.

2. The lighting display device for a vehicle according to claim 1,
wherein a Y-shaped connection wall connecting three top parts at intervals of every other hexagonal surrounding wall is provided on a front part side of each of the tubes in the lighting display direction.

3. The lighting display device for a vehicle according to claim 2,
wherein the Y-shaped connection wall is formed to have a narrower width than the surrounding wall in a front view.

4. A lighting display device for a vehicle comprising:
a tube assembly wall in which a plurality of tubes directed in a lighting display direction at the front or rear of a vehicle are arrayed in a vertical direction and a vehicle width direction;
a plurality of light sources which are disposed facing the inside of at least some tubes in the tube assembly wall; and
a lighting controller which controls lighting of the light sources such that information such as figures and characters is displayed,
wherein the tubes each include
a contour wall disposed toward the lighting display direction, and an inner wall extending from the contour wall to a side opposite in the lighting display direction, and the light sources are each disposed at a position overlapping the inner wall in a forward-rearward direction on an inward side of the inner wall.

5. The lighting display device for a vehicle according to claim 4, wherein a light blocking wall extending to a front side in the lighting display direction is provided in an upper region of at least a part of the contour wall.

6. A lighting display device for a vehicle comprising:

a tube assembly wall in which a plurality of tubes directed in a lighting display direction at the front or rear of a vehicle are arrayed in a vertical direction and a vehicle width direction;

a plurality of light sources which are disposed facing the inside of at least some tubes in the tube assembly wall; and a lighting controller which controls lighting of the light sources such that information such as figures and characters is displayed, wherein the tube assembly wall is provided between a left and right headlights or between a left and right brake lamps at the rear of the vehicle, and is visible from outside the vehicle.

\* \* \* \* \*